(12) United States Patent
Raybould et al.

(10) Patent No.: US 7,638,178 B2
(45) Date of Patent: Dec. 29, 2009

(54) PROTECTIVE COATING FOR CERAMIC COMPONENTS

(75) Inventors: Derek Raybould, Denville, NJ (US);
Chien-Wei Li, Livingston, NJ (US);
Bjoern Schenk, Phoenix, AZ (US);
Thomas E. Strangman, Prescott, AZ (US)

(73) Assignee: Honeywell International Inc., Morristown, NJ (US)

( * ) Notice: Subject to any disclaimer, the term of this patent is extended or adjusted under 35 U.S.C. 154(b) by 785 days.

(21) Appl. No.: 10/982,445

(22) Filed: Nov. 5, 2004

(65) Prior Publication Data

US 2006/0099358 A1 May 11, 2006

(51) Int. Cl.
*B32B 1/00* (2006.01)
*B32B 9/00* (2006.01)

(52) U.S. Cl. .............. 428/34.6; 428/34.1; 428/34.4; 428/688; 428/689; 428/697; 428/698; 428/699; 428/701; 428/702; 428/704

(58) Field of Classification Search ............... 428/34.1, 428/34.4, 34.6, 688, 689, 697, 698, 699, 428/701, 702, 704
See application file for complete search history.

(56) References Cited

U.S. PATENT DOCUMENTS

| 4,340,508 A | 7/1982 | Wahlers et al. |
|---|---|---|
| 4,492,522 A | 1/1985 | Rossmann et al. |
| 4,643,648 A | 2/1987 | Huller |
| 5,578,349 A | 11/1996 | Koshkarian |
| 5,914,189 A | 6/1999 | Hasz et al. |
| 5,942,791 A * | 8/1999 | Shorrocks et al. ........... 257/522 |
| 6,159,553 A | 12/2000 | Li et al. |
| 6,482,537 B1 | 11/2002 | Strangman et al. |
| 6,620,664 B2 * | 9/2003 | Ma et al. .................... 438/183 |

FOREIGN PATENT DOCUMENTS

| EP | 0 442 632 A2 | 8/1991 |
|---|---|---|
| WO | WO 01/10795 A1 | 2/2001 |

\* cited by examiner

*Primary Examiner*—Rena L Dye
*Assistant Examiner*—Walter B Aughenbaugh
(74) *Attorney, Agent, or Firm*—Ingrassia Fisher & Lorenz, P.C.

(57) ABSTRACT

A protective coating for a component comprising a ceramic based substrate, and methods for protecting the component, the protective coating adapted for withstanding repeated thermal cycling. The substrate may comprise silicon nitride or silicon carbide, and the protective coating may comprise at least one tantalate of scandium, yttrium, or a rare earth element. The protective coating may further comprise one or more metal oxides. The coating protects the substrate from combustion gases in the high temperature turbine engine environment. The coating may be multi-layered and exhibits strong bonding to Si-based substrate materials and composites.

29 Claims, 7 Drawing Sheets

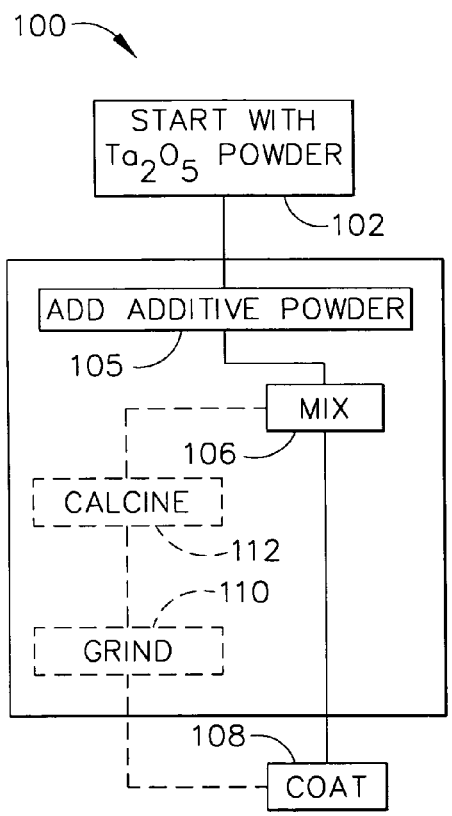
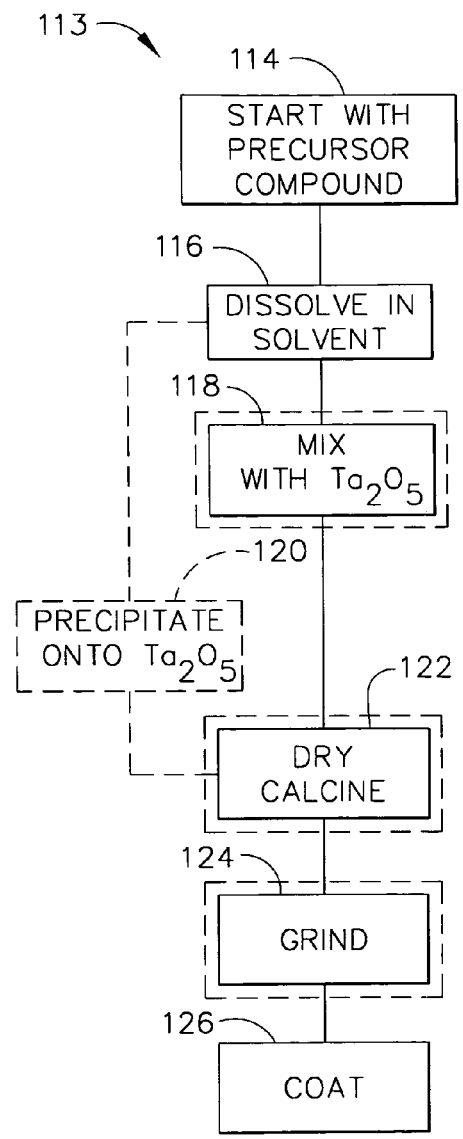
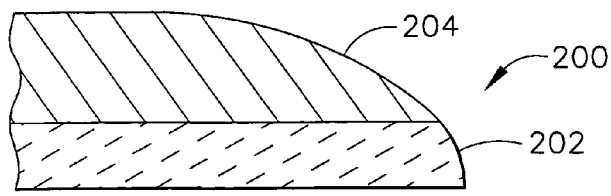
FIG. 1
FIG. 2
FIG. 3

US 7,638,178 B2

PROTECTIVE COATING FOR CERAMIC COMPONENTS

BACKGROUND OF THE INVENTION

The present invention relates to protective coatings for ceramic materials, and to methods for protecting silicon-based components.

Advanced turbomachines use silicon (Si)-based ceramics such as silicon nitride, silicon carbide, and their composites for hot-section components. Due to the high temperature capability of Si-based ceramics, those ceramic turbomachines operate at higher temperatures with higher engine performance. However, at operating temperatures above 1200° C., the Si-based ceramics can be adversely affected by oxidation and water vapor present in the flow stream. Such a hostile engine environment results in rapid recession of Si-based ceramics parts.

U.S. Pat. No. 6,159,553 discloses the use of tantalum oxide ($Ta_2O_5$) as coating material on silicon nitride parts. A tantalum oxide coating of 2 to 500 microns in thickness can effectively protect the surface of silicon nitride parts from oxidation and reacting with water vapor at high temperatures. However, there are some limitations on tantalum oxide coating on Si-based parts:

1. $Ta_2O_5$ undergoes a phase transformation from low temperature phase (beta-phase) to high temperature phase (alpha-phase) at about 1350° C., which may cause cracking in the coating due to the volume change occurred during the phase transformation.

2. $Ta_2O_5$ is susceptible to grain growth at temperatures above 1200° C. Pronounced grain growth results in large grain microstructure, which reduces the mechanical strength of the coating and induces high local residual stresses in the coating, and causes the coating to spall off.

3. $Ta_2O_5$ has a coefficient of thermal expansion (CTE) about $3 \times 10^{-6\circ}$ C.$^{-1}$, whereas silicon nitride has a CTE in the range of $3$-$4 \times 10^{-6\circ}$ C.$^{-1}$ and silicon carbide (SiC) has a CTE in the range of $4$-$5 \times 10^{-6\circ}$ C.$^{-1}$. Since there is about 10 to 30% CTE mismatch between $Ta_2O_5$ and silicon nitride, and an even higher CTE mismatch between $Ta_2O_5$ and silicon carbide, residual stresses will develop in the $Ta_2O_5$ coating on Si-based ceramics. The residual stresses can limit the service life of the coating.

4. A pure $Ta_2O_5$ coating has low fracture toughness, which may adversely affect the mechanical integrity and the lifetime of the coating during service due to foreign object impact and particulate erosion events.

With those limitations, a $Ta_2O_5$ coating on Si-based ceramics would not provide adequate protection for turbine engine applications in which the maximum temperature goes above 1350° C., thousands of thermal cycles occur, and greater than five thousand (5000) hour coating lifetime is required. It would be highly desirable to provide an environmental and thermal barrier coating to meet the stringent demands for advanced ceramic turbine engine applications.

As can be seen, there is a need for a protective coating for ceramic components, wherein the coating is resistant to thermal cycling in a gas turbine environment.

SUMMARY OF THE INVENTION

According to one aspect of the present invention, a component comprises a silicon-based substrate; and a protective coating disposed on the substrate, the protective coating comprising at least one layer of a tantalate-containing material, the tantalate-containing material comprising at least one tantalate such as a rare earth tantalate, scandium tantalate, yttrium tantalate, or mixtures thereof.

According to a further aspect of the present invention, a thermally protected component comprises a silicon-based substrate; and a protective coating of crystalline composition adhered to an outer surface of the substrate, wherein the protective coating comprises an alloy including at least 50 mol % of a rare earth tantalate, scandium tantalate, yttrium tantalate, or mixtures thereof; and the balance comprising at least one oxide of an element such as Ta, Al, Hf, Ti, Zr, Mo, Nb, Ni, Sr, Mg, Si, Sc, Y, and the rare earth elements including the lanthanide series of elements.

According to still a further aspect of the present invention, a component for a gas turbine engine comprises a silicon-based substrate comprising silicon nitride or silicon carbide; and a multi-layered protective coating of crystalline composition adhered to an outer surface of the substrate, wherein the protective coating comprises at least one layer of a tantalate-containing material, and at least one layer of a silicate material, wherein the tantalate-containing material comprises at least 50 mol % of a rare earth tantalate, scandium tantalate, yttrium tantalate, or mixtures thereof; and the balance comprises at least one oxide of an element such as Ta, Al, Hf, Ti, Zr, Mo, Nb, Ni, Sr, Mg, Si, Sc, Y, and the rare earth elements including the lanthanide series of elements; and wherein the silicate material comprises a silicate of at least one of a rare earth element, scandium, and yttrium. The silicate layer may be the innermost layer of the multi-layered protective coating. The innermost layer may also contain up to 50 mol % of $S_3N_4$ particles and/or SiC particles, with a particle size of <10 microns, and in some embodiments <2 microns. A thermal barrier layer, which may comprise stabilized zirconia or stabilized hafnia, such as yttria stabilized zirconia or yttria stabilized hafnia, may be disposed over the silicate and tantalate layers.

According to yet a further aspect of the present invention, a protective coating for a component comprises at least one layer of a tantalate-containing material comprising at least 50 mol % of a rare earth tantalate, scandium tantalate, yttrium tantalate, or mixtures thereof; and the balance comprises at least one oxide of Ta, Al, Hf, Ti, Zr, Mo, Nb, Ni, Sr, Mg, Si, Sc, Y, and the rare earth elements including the lanthanide series of elements.

According to still another aspect of the present invention, a method for protecting a ceramic component comprises providing a silicon-based substrate for the component; and forming a protective coating on the substrate, wherein the protective coating comprises at least one tantalate such as a rare earth tantalate, scandium tantalate, yttrium tantalate, and mixtures thereof.

According to yet another aspect of the present invention, a method for protecting a ceramic component comprises providing a substrate for the component; and forming at least a first layer of tantalate-containing material on the substrate, wherein the tantalate-containing material comprises a rare earth tantalate, scandium tantalate, yttrium tantalate, or mixtures thereof.

According to yet a further aspect of the present invention, a method for forming a component comprises providing a substrate of silicon nitride or silicon carbide; and forming a protective coating on the substrate. The step of forming the protective coating may include mixing tantalum oxide with at least one oxide or oxide precursor of scandium, yttrium, or a rare earth element to form a mixture; reacting the mixture to form a reaction product comprising at least one tantalate such as a rare earth tantalate, scandium tantalate, yttrium tantalate, and mixtures thereof, wherein the reaction product comprises at least 50 mol % of the at least one tantalate; and applying the reaction product to the substrate.

According to still a further aspect of the present invention, a method for forming a component, comprises providing a substrate comprising silicon nitride or silicon carbide; and forming a protective coating on the substrate. The protective coating may be formed by providing a slurry of tantalum oxide, or a slurry of at least one oxide or oxide precursor of scandium, yttrium, or a rare earth element; adding a powder to the slurry to form a mixture, the powder comprising at least one oxide or oxide precursor of scandium, yttrium, a rare earth element, or tantalum oxide; applying the mixture to the substrate; and reacting the mixture on the substrate to form a reaction product, the reaction product comprising at least one tantalate of a rare earth tantalate, scandium tantalate, yttrium tantalate, or mixtures thereof, and wherein the reaction product comprises at least 50 mol % of the at least one tantalate.

These and other features, aspects, and advantages of the present invention will become better understood with reference to the following drawings, description, and claims.

BRIEF DESCRIPTION OF THE DRAWINGS

FIG. 1 illustrates a first method of improving the crystalline structure of a coating composition, according to one embodiment of the invention;

FIG. 2 illustrates a second method of improving the crystalline structure of a coating composition, according to another embodiment of the invention;

FIG. 3 is a schematic view of a component formed according to another embodiment of the invention;

DETAILED DESCRIPTION OF THE INVENTION

Figure 4A:
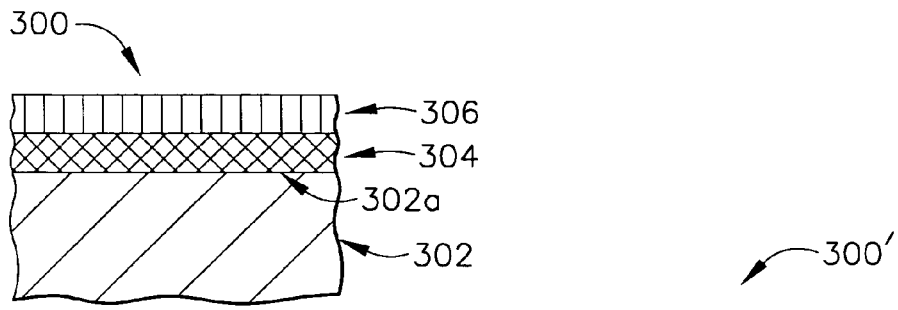
FIG. 4A schematically represents a section of a component having a protective coating thereon, according to another embodiment of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention relates to tantalate-based coatings which can effectively protect Si-based ceramic parts, such as engine parts, even when repeatedly subjected to extreme temperatures during operation. The present invention also relates to silicon-based components having a protective coating comprising a tantalate of a rare earth element, a tantalate of scandium, a tantalate of yttrium, or mixtures thereof. Such coated components may be, for example, a nozzle, a wheel, a combustion chamber, a turbine shroud, a hot gas duct, or an airfoil of a gas turbine engine, such as an auxiliary power unit (APU) of an aircraft.

Unlike prior art coatings, protective coatings of the present invention may comprise at least one tantalate such as scandium tantalate, yttrium tantalate, a tantalate of a rare earth element, or mixtures thereof, and may protect silicon-based components during thermal cycling in an advanced, high temperature gas turbine engine environment. In some embodiments, protective coatings of the present invention may further comprise one or more oxides, and may provide a coefficient of thermal expansion (CTE) match with a silicon-based substrate.

The solid solubility of $Al_2O_3$ in $Ta_2O_5$ may be about 10 mol % at about 1500° C. Since alpha-$Al_2O_3$ has a CTE about $8 \times 10^{-6 \circ}$ C.$^{-1}$, the CTE of a 10 mol % $Al_2O_3$-90 mol % $Ta_2O_5$ alloy would be about $3.5 \times 10^{-6 \circ}$ C.$^{-1}$, which is 10% higher than that of pure $Ta_2O_5$ and closer to the CTE of silicon nitride. When the amount of $Al_2O_3$ in $Ta_2O_5$ exceeds about 10 mol %, a second phase having the formula of $AlTaO_4$ forms that has a CTE about $5 \times 10^{-6 \circ}$ C.$^{-1}$. As the alloy composition increases to about 25 mol % $Al_2O_3$-75 mol % $Ta_2O_5$, the microstructure includes a mixture of $Ta_2O_5$—$Al_2O_3$ solid solution and the $AlTaO_4$ compound, and the CTE is about $4 \times 10^{-6 \circ}$ C.$^{-1}$, which matches well with that of SiC. If the $Al_2O_3$ concentration exceeds 25 mol %, the CTE of the coating may become too high for application on $Si_3N_4$ substrates. For SiC and its composites, having CTE values in the range of $4-5 \times 10^{-6 \circ}$ C.$^{-1}$, the $Ta_2O_5$ coating can incorporate up to 50 mol % $Al_2O_3$ so that the majority of the phase in the coating becomes $AlTaO_4$, and the CTE matches very well with the substrate.

A variety of ceramic processing methods may be used in forming coatings of the present invention. As shown by the method 100 in FIG. 1, the process may start with a commercially available $Ta_2O_5$ powder (step 102), to which a desirable amount of additive(s) may be added (step 105). To form a coating comprising scandium tantalate, scandium oxide may be used as additive. The amount of additive required may be calculated according to the desired composition of the coating, for instance the ScTaO4 content. The additives, or their precursors, may be in the form of powders that require only simple (either dry or wet) mixing with the $Ta_2O_5$ powder (step 106). After mixing (and drying, if wet mixing in a liquid medium is performed), the mixture 120 may be used in a coating operation or step 108. Optionally, the mixture may be subjected to a calcination step (step 112), in which the mixture may be heat-treated to a temperature of up to about 1700° C., and a milling or grinding step (step 110), before the coating step 108. During the calcining step 112, if used, the mixture may be fully or partially transformed to the desired tantalate. Coating may then be performed in step 108, as described below.

Referring to FIG. 2, an alternative method 113 for applying the additives includes starting with precursor compounds (either solids or liquids) containing the additive ions (step 114). The precursor compounds may be dissolved in a solvent, such as water or an alcohol (step 116); mixed with $Ta_2O_5$ powder (step 118), and then precipitated onto the surface of the $Ta_2O_5$ particles (step 120). Alternatively, the $Ta_2O_5$ powder can be dispersed in the solvent first, and the precursors added $Ta_2O_5$/solvent mixture. After drying (step 122), calcining (step 122), and/or milling/grinding (step 124), the mixture may be used in the coating operation or steps 108, 126.

The coating steps 108, 126 for applying the mixture created by either of the methods 100 or 113 may include deposition by plasma spray, sol gel, and chemical vapor deposition techniques. The coating may also be formed by sintering pressed ingots or similar components at about 1350° C. for 1 to about 20 hours, and using Physical Vapor Deposition, (PVD) or Electron Beam Physical Vapor Deposition (EB-PVD) methods, the latter being well known in the field of thermal barrier coatings for superalloy turbine engine parts. Coatings formed by both PVD and EB-PVD may have the advantage of forming a smooth surface, allowing strong bonding to the substrate, and providing uniform additive distribution.

FIG. 3 shows a component 200 formed in accordance with some embodiments of the present invention. Component 200 may include a substrate 202, which may be formed of Si-based material, such as a SiC—SiC composite material. A thermal protective coating layer 204 may be applied to the outer surface of substrate 202, for example, as described above.

FIG. 4A schematically represents a section of a component 300, according to another embodiment of the present invention. Component 300 may have certain features in common with component 200 shown and described with reference to FIG. 3, supra. For example, component 300 may include a silicon-based ceramic substrate 302, which may comprise silicon nitride or silicon carbide. Component 300 may have a protective coating 304 on a surface 302a of substrate 302. Protective coating 304 may comprise a tantalate-containing material. The tantalate-containing material may include at least one tantalate, such as a rare earth tantalate, scandium tantalate, yttrium tantalate, or mixtures thereof. The tantalate-containing material may typically comprise at least about 50 mol % of the at least one tantalate, in some embodiments at least about 90 mol % of the at least one tantalate, and in other embodiments at least about 99 mol % of the at least one tantalate.

In some embodiments, the tantalate-containing material may comprise predominantly scandium tantalate, for example, the tantalate-containing material may comprise more than 50 mol % scandium tantalate. In other embodiments, the tantalate-containing material may consist essentially of scandium tantalate.

The tantalate-containing material may further comprise, for example, as balance, at least one oxide. The at least one oxide may be an oxide of one or more of the following elements: Ta, Al, Hf, Ti, Zr, Mo, Nb, Ni, Sr, Mg, Si, Sc, Y, and the rare earth elements including the lanthanide series of elements.

The tantalate-containing material may also comprise one or more additives, e.g., nitrides, carbides, borides, silicides, or mixtures thereof, that can be introduced to inhibit grain growth, modify CTE, and reinforce the tantalate, which may result in lower grain growth, higher CTE, and increased fracture toughness of protective coating 304. Additives comprising nitrides, carbides, borides, and silicides, or mixtures thereof, may have a combined content in the tantalate-containing material of less than 50 mol %. Such additives, e.g., silicon nitride or silicon carbide, or mixtures thereof, may be present as particles in the tantalate-containing material. Such additives comprising, e.g., nitrides, carbides, borides, and silicides, or mixtures thereof, may react together, or with other constituents of protective coating 304, at temperatures experienced by protective coating 304 during service; and such additives may be qualitatively and quantitatively selected so as to form reaction products that may be beneficial to the protective properties of protective coating 304. As an example, when such additives comprise $Si_3N_4$ and SiC, the $Si_3N_4$/SiC ratio may be selected so that if $Si_3N_4$ and SiC reacts with oxygen within protective coating 304, $Si_2ON_2$ is formed.

Protective coating 304 may be a multi-layered coating, for example, as described with reference to FIG. 4B, infra. Component 300 may be a part for a gas turbine engine, such as a nozzle, a wheel, a combustion chamber, a turbine shroud, a hot gas duct, or an airfoil. Component 300 may further include a thermal barrier coating (TBC) 306. TBC 306 may be disposed directly on protective coating 304. TBC 306 may comprise for example, a stabilized zirconia, such as an yttria stabilized zirconia. A TBC comprising yttria stabilized zirconia is disclosed in commonly assigned U.S. Pat. No. 6,482,537 entitled Lower Conductivity Barrier Coating, the disclosure of which is incorporated by reference herein in its entirety.

Figure 4B:
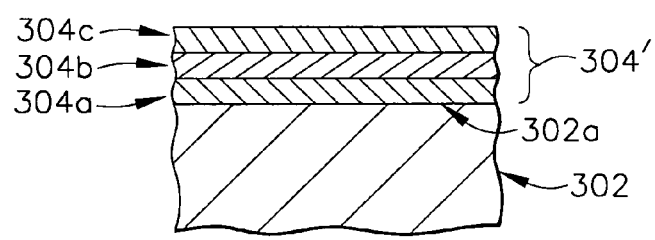
FIG. 4B schematically represents a section of a component having a multi-layered protective coating thereon, according to another embodiment of the invention.

FIG. 4B schematically represents a section of a component 300' having a multi-layered protective coating 304' thereon, according to another embodiment of the invention. As shown, protective coating 304' may comprise three layers: a first layer 304a disposed on substrate surface 302a of substrate 302, a second layer 304b disposed on first layer 304a, and a third layer 304c disposed on second layer 304b. Other numbers of layers are also within the scope of the invention.

Protective coating 304' may comprise alternating layers of a tantalate-containing material and a silicate material. For example, first layer 304a and third layer 304c may each comprise a tantalate-containing material, while second layer 304b may comprise a silicate material. In an alternative embodiment, first layer 304a and third layer 304c may each comprise a silicate material, while second layer 304b may comprise a tantalate-containing material. The tantalate-containing material may have a composition as described hereinabove, e.g., with reference to FIG. 4A. The silicate material may comprise a silicate of a rare earth element, a silicate of scandium, or a silicate of yttrium, or mixtures thereof. As an example, the silicate material may comprise at least one of scandium monosilicate ($Sc_2SiO_5$) and scandium disilicate ($Sc_2Si_2O_7$).

One or more of first, second and third layers 304a, 304b, 304c may serve as an oxygen barrier coating (OBC) and/or as an environmental barrier coating (EBC) for substrate 302. An oxygen and environmental barrier coating comprising scandium silicates for protecting ceramic components was disclosed in commonly assigned co-pending U.S. patent application Ser. No. 10/719,629 entitled Oxidation Barrier Coatings for Silicon Based Ceramics, the disclosure of which is incorporated by reference herein in its entirety. Component 300' may have a TBC 306 (see, e.g., FIG. 4A) disposed on protective coating 304'.

In some embodiments, the first layer 304a may additionally or alternatively serve as a diffusion barrier coating (DBC) disposed below an OBC and/or an EBC. As an example only, such a DBC may comprise a layer of pure silicon nitride, pure silicon carbide, or pure silicon oxynitride, as disclosed in commonly assigned co-pending U.S. patent application Ser. No. 10/719,629 entitled Oxidation Barrier Coatings for Silicon Based Ceramics, the disclosure of which is incorporated by reference herein in its entirety. Alternatively, the DBC may comprise silicon or refractory silicon-base intermetallics, including $TaSi_2$ and $MoSi_2$. The DBC may be disposed directly on the substrate surface and may be disposed below a layer of tantalate-containing material and/or a layer of silicate material. The layer of tantalate-containing material or the layer of silicate material may be disposed directly on the DBC.

Figure 5A:
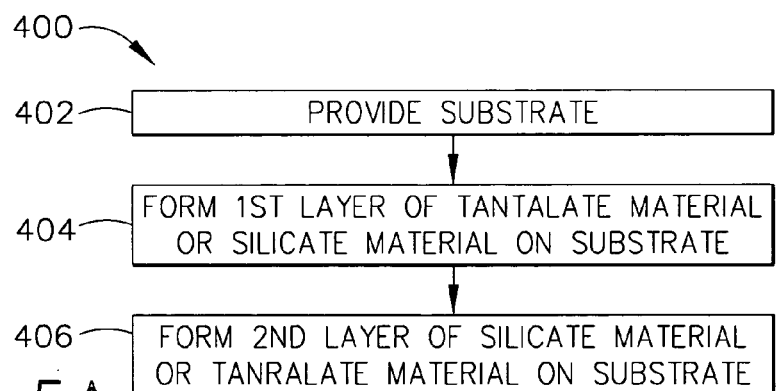
FIG. 5A schematically represents a series of steps involved in a method for forming a multi-layered protective coating on a component, according to another embodiment of the invention.

FIG. 5A schematically represents a series of steps involved in a method 400 for forming a multi-layered protective coating on a component, according to another embodiment of the invention. The component may be a ceramic component for a gas turbine engine. Step 402 may involve providing a substrate for the component. The substrate may be a silicon-based ceramic, such as silicon nitride or silicon carbide. An external surface of the substrate to be coated may be roughened, and/or contacted with a surface tension lowering agent or degreasing solvent, prior to coating.

Step 404 may involve forming a first layer on a surface of the substrate. The first layer may comprise a tantalate-containing material or a silicate material. The tantalate-containing material may have the composition as described hereinabove, for example, with reference to FIG. 4A. For example, the tantalate-containing material may comprise at least one tantalate such as a rare earth tantalate, scandium tantalate, yttrium tantalate, or mixtures thereof in an amount of at least about 50 mol %, and the balance may comprise an oxide of one or more of: Ta, Al, Hf, Ti, Zr, Mo, Nb, Ni, Sr, Mg, Si, Sc, Y, and the rare earth elements including the lanthanide series of elements. The layer of silicate material may be formed by the addition of up to 40 mol % of a particulate material such as $Si_3N_4$, SiC, $Si_2ON_2$, or mixtures thereof, wherein the particulate material may comprise particles having a diameter typically less than 10 microns, and in some embodiments having a diameter less than 2 microns. The silicate material may have the composition as described hereinabove, for example, with reference to FIG. 4B. For example, the silicate material of the first or second layer may comprise, for example, a silicate of a rare earth element, a silicate of scandium, or a silicate of yttrium, or mixtures thereof.

Step 406 may involve forming at least a second layer on the first layer. The second layer may comprise either a silicate material or a tantalate-containing material. In some embodiments, additional layers may be added to provide a multi-layered coating having three (3), or four (4), or more layers. In some embodiments, the multi-layered coating may comprise alternating layers of a tantalate-containing material and a silicate material, for example, as described hereinabove for protective coating 304' with reference to FIG. 4B. Each layer of the multi-layered coating may have a thickness in the range of from about 0.25 mils (about 6 microns) to about 3 mils (about 75-80 microns).

Each layer of the multi-layered coating may be deposited by a technique such as plasma spraying, physical vapor deposition (PVD), electron beam physical vapor deposition (EB-PVD), chemical vapor deposition (CVD), or slurry (dip) coating. In the case of slurry coating, each layer of the multi-layered coating may have a thickness in the range of from about 2 to 20 microns, and typically from about 5 to 10 microns. In the case of plasma spraying, each layer of the multi-layered coating may have a thickness in the range of from about 10 to 80 microns, and typically from about 20 to 75 microns. Each layer of the multi-layered coating may function as an OBC and/or as an EBC for protecting the substrate of the component. In some embodiments, a thermal barrier coating may be applied on the multi-layered coating (see, for example, FIG. 5B).

The first and second layers, which may serve, respectively as a DBC and as an OBC, may each have incorporated therein fine particles of $Si_3N_4$, SiC, or $Si_2ON_2$, or mixtures thereof. As an example, such fine particles may serve to modify the coefficient of thermal expansion of the various layers, or to form beneficial products, such as $Si_2ON_2$, during service conditions. Such fine particles may have a diameter of 10 microns or less, and in some embodiments may have a diameter of less than 2 microns.

Figure 5B:
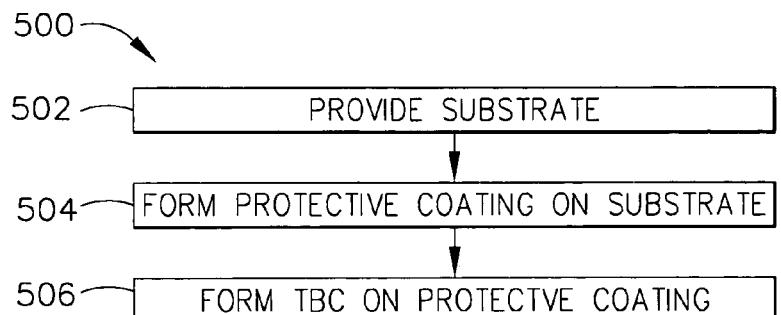
FIG. 5B schematically represents a series of steps involved in a method for protecting a component by applying thereto a protective coating, according to another embodiment of the invention.

FIG. 5B schematically represents a series of steps involved in a method 500 for protecting a component by applying thereto a protective coating, according to another embodiment of the invention. Step 502 may involve providing a substrate for the component, essentially as described hereinabove with reference to FIG. 5A. Thereafter, step 504 may involve forming a protective coating on a surface of the substrate.

The protective coating formed in step 504 may have a total thickness in the range of from about 0.5 to 50 mils (about 12 to about 1300 microns), typically from about 0.5 to 35 mils, and often from about 1 to 25 mils. The protective coating may be formed essentially as described for method 400 (FIG. 5A), supra. For example, the protective coating formed in step 504 may be a single layer coating or a multi-layered coating. At least one layer of the protective coating may comprise a tantalate-containing material, as described hereinabove (e.g., with reference to FIGS. 4A and 5A). In the case of a multi-layered coating, one or more layers may comprise a silicate material, also as described hereinabove (e.g., with reference to FIGS. 4B and 5A).

After step 504, step 506 may involve forming a thermal barrier coating (TBC) on the protective coating. The TBC may be deposited by a process generally known in the art, such as plasma spraying, physical vapor deposition (PVD), or electron beam physical vapor deposition (EB-PVD). The TBC may comprise for example, a stabilized zirconia, such as an yttria stabilized zirconia, or a stabilized hafnia, such as yttria stabilized hafnia.

Figure 6A:
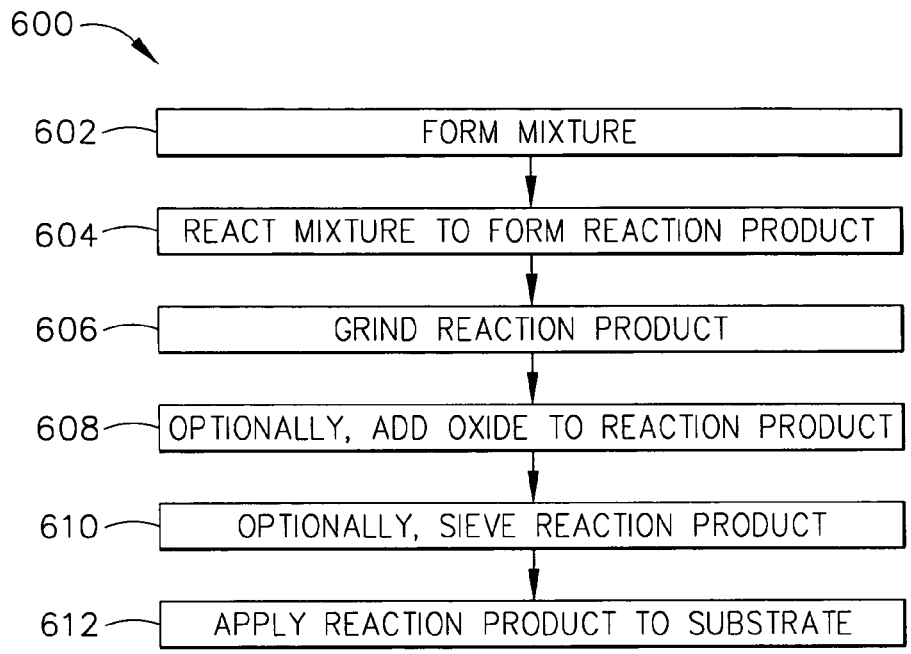
FIGS. 6A and 6B each schematically represent a series of steps involved in a method for forming a component having a protective coating thereon, according to two different embodiments of the invention.

FIG. 6A schematically represents a series of steps involved in a method 600 for forming a component having a protective coating thereon, according to another embodiment of the invention. Step 602 may involve forming a mixture. Generally, the mixture may be formed, for example, as described hereinabove, e.g., with reference to FIG. 1, or as described in the Examples. The mixture may contain a powder mix of tantalum oxide ($Ta_2O_5$) and at least one oxide, or oxide precursor, of scandium, yttrium, or a rare earth element. As a non-limiting example, the mixture may contain a combination of tantalum oxide and scandium oxide that upon reaction will form stoichiometric scandium tantalate.

Step 604 may involve reacting the mixture to form a reaction product. The reaction product typically includes at least one tantalate, such as a rare earth tantalate, scandium tantalate, yttrium tantalate, or mixtures thereof. As a non-limiting example, the reaction product may comprise predominantly scandium tantalate ($ScTaO_4$). Step 604 may typically involve reacting the mixture at a temperature in the range of from about 1600 to 1650° C. The temperature may be maintained in this range for a period of from about 1 to 8 hours, and often from about 2 to 4 hours.

Step 606 may involve grinding the reaction product, for example, to break up aggregates of the reaction product. Optional step 608 may involve adding one or more oxides, or oxide precursors, to the reaction product formed in step 604. The one or more oxides may comprise oxides of an element such as Ta, Al, Hf, Ti, Zr, Mo, Nb, Ni, Sr, Mg, Si, Sc, Y, and the rare earth elements including the lanthanide series of elements. The amount of oxide added to the reaction mixture in step 608 may be varied according to the desired amount of oxide in the protective coating. As an example, the CTE of scandium tantalate at 1000° C. is $4.99 \times 10^{-6\circ}$ C.$^{-1}$, which is close to that of silicon carbide (CTE in the range of $4\text{-}5 \times 10^{-6\circ}$ C.$^{-1}$). For coating a silicon nitride substrate (CTE in the range of $3\text{-}4 \times 10^{-6\circ}$ C.$^{-1}$), the CTE of a material, e.g., containing scandium tantalate, may be decreased (if desired) by the addition of an appropriate amount of an oxide, as defined hereinabove, to the reaction product.

Optional step 610 may involve sieving the reaction product to provide particles having a diameter in the range of from about 5 to 100 microns. The reaction product may be sieved before or after step 608, i.e., before or after addition of an oxide to the reaction product. Step 612 may involve applying the reaction product, including any oxide added in step 608, to a surface of the substrate, such that the protective coating may be adhered to an outer surface of the substrate. The substrate may be a silicon-based material, such as silicon nitride or silicon carbide. In general, step 612 may be performed as described hereinabove for deposition of coatings with reference to FIGS. 5A and 5B. Step 612 may involve applying the reaction product to the substrate by plasma spraying, PVD, EB-PVD, and the like, to form a solid, crystalline protective coating on the surface of the substrate. As noted hereinabove, the protective coating may be a multi-layered coating, and step 612 may involve applying a plurality of layers to the substrate.

Figure 6B:
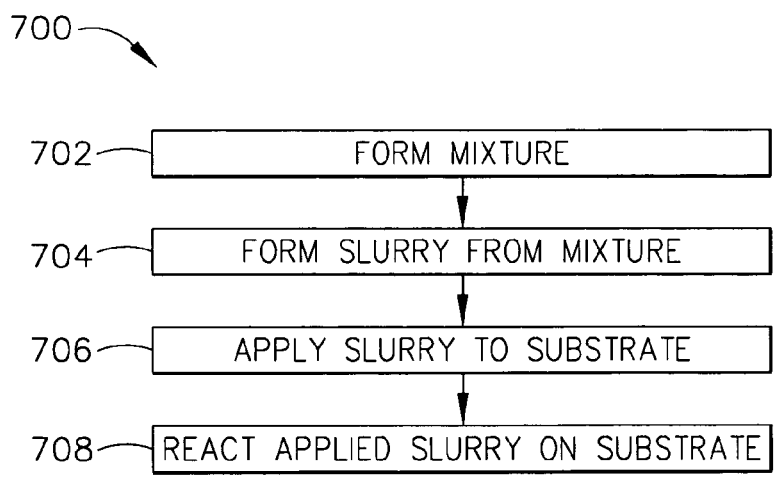

FIG. 6B schematically represents a series of steps involved in a method 700 for forming a component having a protective coating thereon, according to another embodiment of the invention. Step 702 may involve forming a mixture, which may be formed essentially as described for step 602 of method 600, supra (FIG. 6A). For example, the mixture may contain a powder mix of tantalum oxide ($Ta_2O_5$) and at least one oxide or oxide precursor of scandium, yttrium, or a rare earth element. Step 704 may involve forming a slurry of the mixture in a suitable liquid. The liquid may be water or an organic solvent, such as an alcohol, e.g., isopropanol, ethanol, and the like, or a mixture of water and an alcohol.

Step 706 may involve applying the slurry to the surface of a substrate. The substrate may be a silicon-based material, such as silicon nitride or silicon carbide, for a gas turbine engine component. The slurry may be applied to the substrate, for example, by air spraying or dip coating.

Step 708 may involve reacting the applied slurry on the substrate surface, such that the slurry forms the protective coating, which may be adhered to an outer surface of the substrate. As an example, step 708 may involve sintering the applied slurry at a temperature in the range of from about 1450 to 1550° C. The temperature may be maintained within the stated range for a period of from about 0.1 to 8 hours, typically from about 0.1 to 2 hours, and often from about 0.2 to 1 hour. The protective coating thus formed may comprise a solid crystalline coating comprising at least one layer of a tantalate-containing material. The tantalate-containing material may comprise at least one tantalate, such as a rare earth tantalate, scandium tantalate, yttrium tantalate, and mixtures thereof. The protective coating thus formed may serve as at least one of an OBC and/or an EBC for the component to be protected. In some embodiments, a TBC may be applied to the protective coating formed according to method 700.

EXAMPLES

Example 1

Scandium tantalate powder was prepared as follows. For each batch, about 1 kg of commercial beta $Ta_2O_5$ powder was mixed with commercial $Sc_2O_3$ powder. The exact ratio of the powders required to form $ScTaO_4$ was used. The powders were mixed in isopropanol in a milling jar for about 2 hours before drying. The dried powder was compacted to a billet using cold isostatic pressing. This billet was then sintered at a temperature in the range of from about 1600 to 1650° C. A small sample from the sintered billet was removed and prepared for X-ray analysis, which confirmed that the sintered solid was $ScTaO_4$.

Figure 7:
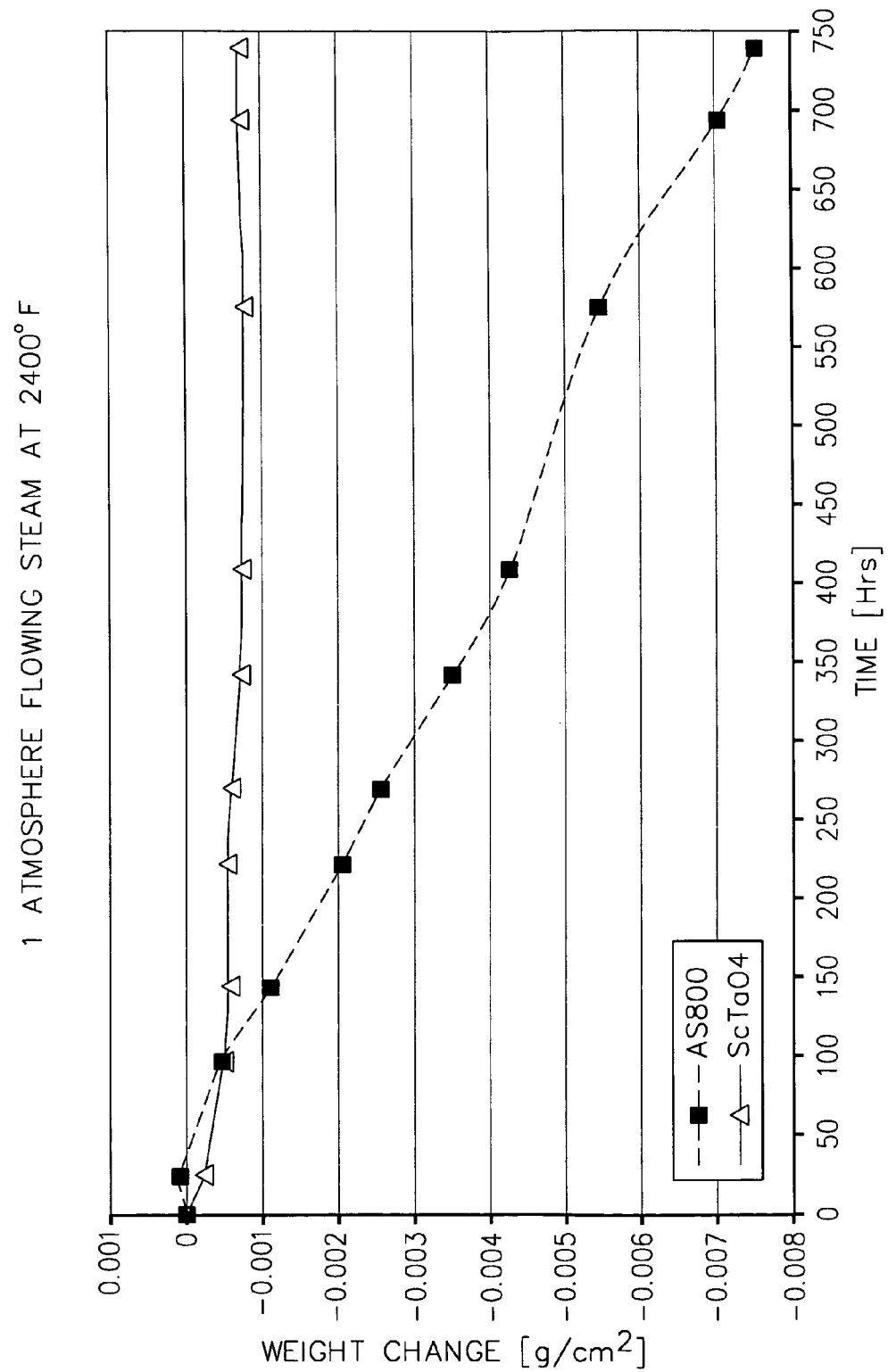
FIG. 7 is a graph showing weight change of scandium tantalate following exposure to flowing steam, according to one aspect of the invention.

The solid sintered billet of $ScTaO_4$ was machined to provide a set of test bars. One such test bar was placed in a furnace at 2400° F. together with a control sample of AS800 $Si_3N_4$. Steam was passed through the furnace so that a pressure of 1 atmos of flowing steam passed over the samples. At intervals the weight of the two samples was checked. As for prior tests, the $Si_3N_4$ continued to loose weight throughout the test, but the $ScTaO_4$ sample showed a negligible weight loss after 24 hrs and then remained stable throughout the 750 hrs of testing (FIG. 7). The ability of $ScTaO_4$ to serve as a protective coating is evident from the data shown in FIG. 7.

Example 2

Scandium tantalate powder was prepared as follows. In each batch, about 1 Kg of commercial beta $Ta_2O_5$ powder was mixed with commercial $Sc_2O_3$ powder in isopropanol in a milling jar for about 2 hours before drying. After drying was complete, the powder was sieved to classify the particle size to about 5 to 100 microns range in preparation for plasma spray coating. If the particle size was too fine, a calcining process was included to coarsen the particles. A coating of the above composition was then applied to coupons of silicon nitride and SiC—SiC composite substrates by an air-plasma spraying process. The silicon nitride coupons had an as-sintered surface on which the plasma coating was applied. Alternatively, a grit-blasted machine surface could have been utilized. The coupons were then degreased, and preheated to about 1000° C. by either a torch or furnace. The powder was then injected into a high velocity, high temperature plasma gun and sprayed onto the substrate to form a coating. The coating thickness varied from about 2 to about 10 mil, or about 50 to about 250 microns.

The coated samples were then subjected to cyclic furnace testing wherein each sample was held in the furnace at about 1315° C. for about 30 minutes, and then quickly removed from the furnace and quenched to about 200° C. in a stream of blowing air. The coated coupons survived about 900 hrs of such testing.

Example 3

Scandium monosilicate ($Sc_2SiO_5$) powder was mixed with water to form a slurry. A sample of $Si_3N_4$ (AS800) was dipped into the slurry and allowed to dry so that it had a coating over all its surface of the $Sc_2SiO_5$. The sample was then dipped again in the slurry and allowed to dry. This process could be repeated but in this case was stopped after the 2 dips. The coating was then sintered on the part at a temperature of between 1400 to 1600° C. Scandium tantalate powder prepared as described in Example 1 was added to water to form a slurry, and the sample dipped in the scandium tantalate slurry to form a coating of scandium tantalate over the monosilicate layer. Dipping in the scandium tantalate slurry was repeated. The coating and part were then sintered as before between 1400 to 1500° C. X-ray was then used to confirm that the two layer coating thus formed was $ScTaO_4$ on $Sc_2SiO_5$ and that other phases had not been formed.

Figure 8:
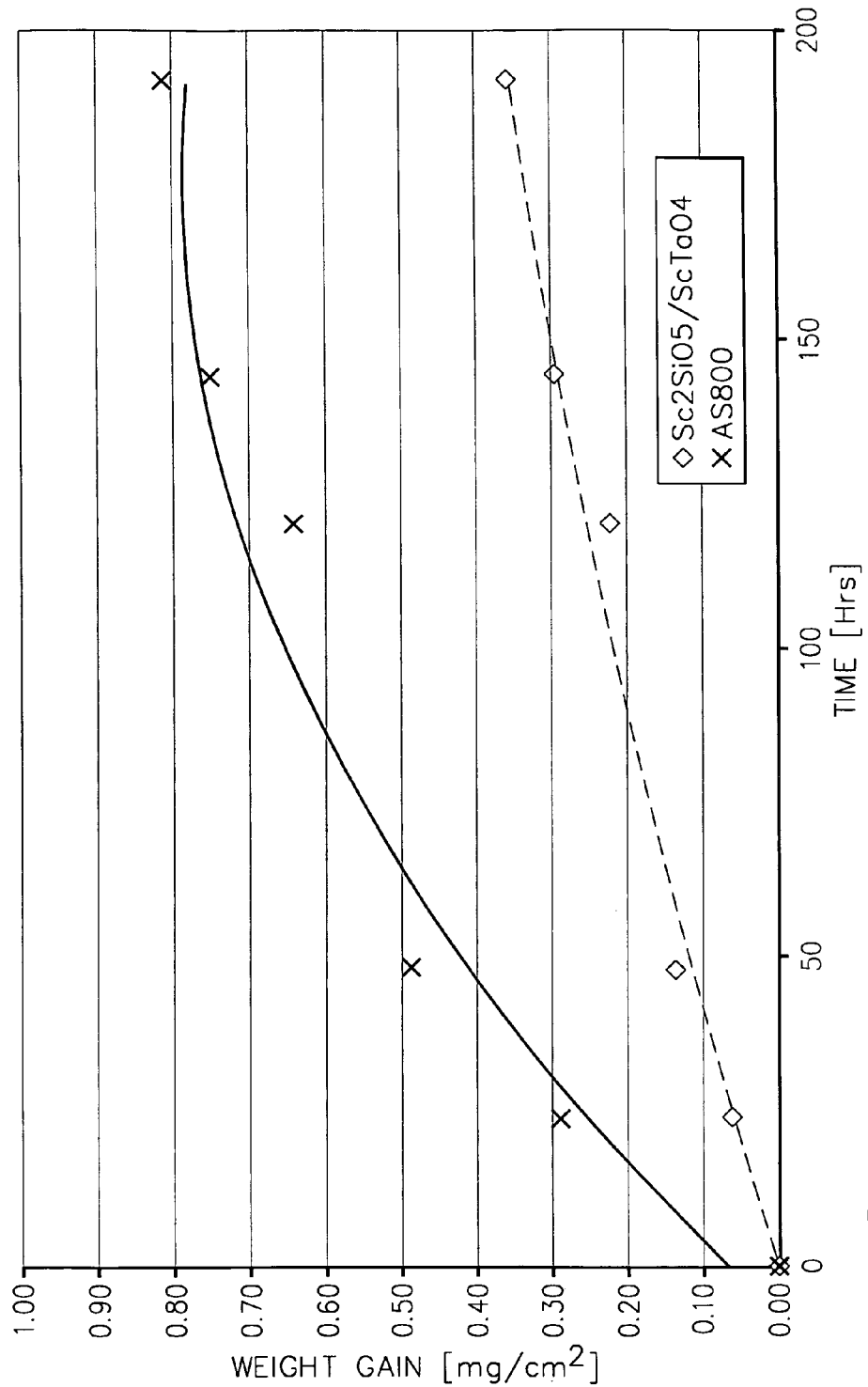
FIG. 8 is a graph showing weight gain of a dual layer coating of $ScTaO_4$ and $Sc_2SiO_5$, following static oxidation in air, according to another aspect of the invention.

The dual layer coating of $ScTaO_4$ on $Sc_2SiO_5$ was tested by static oxidation in air at 2550° F. The dual layer coating reduced the weight gain, as compared to $Si_3N_4$, by about 50%, see FIG. 8.

Example 4

Powders of scandium disilicate and scandium tantalate were prepared in a slurry of water as described in Example 3. A sample of AS800 was dip coated in the $Sc_2Si_2O_7$ slurry with again 2 dip coatings being used, and the coating was sintered at 1400 to 1600° C. The process was then repeated with the $ScTaO_4$ slurry. After sintering, a further layer of $Sc_2Si_2O_7$ was then applied via the dip coating process. The resultant multilayer coating was then checked via X-ray to confirm the presence of $Sc_2Si_2O_7$ and $ScTaO_4$ and the absence of other undesirable phases.

Figure 9:
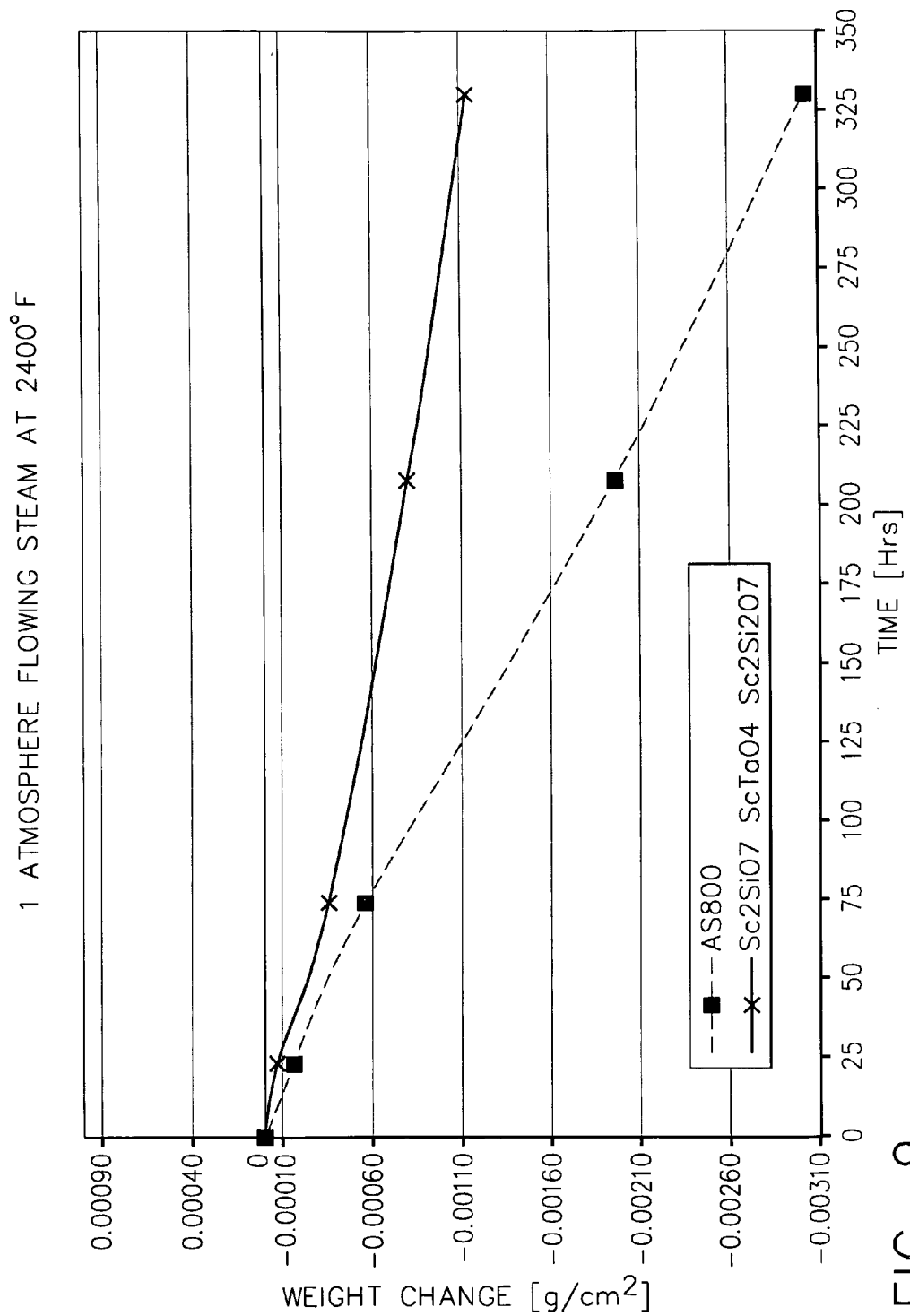
FIG. 9 is a graph showing weight loss of a sample coated with a multilayer coating following exposure to flowing steam, according to another aspect of the invention.

The coated sample was then tested in a steam furnace at 2400° F. under 1 atmosphere of flowing steam. When testing was stopped after 350 hrs, the multilayer coating had around ⅓ of the weight loss of the AS800 control sample, see FIG. 9.

Example 5

Scandium tantalate powder was prepared as described in Example 2. $Ta_2O_5$ powder was air plasma sprayed on to silicon nitride to a thickness of ~1 mil. The tantalum pentoxide acts a bond coat and diffusion barrier. A coating of the scandium tantalate was then air-plasma sprayed to a thickness of 2-4 mil over the $Ta_2O_5$. Only one surface of each of the silicon nitride coupons was coated.

Figure 10:
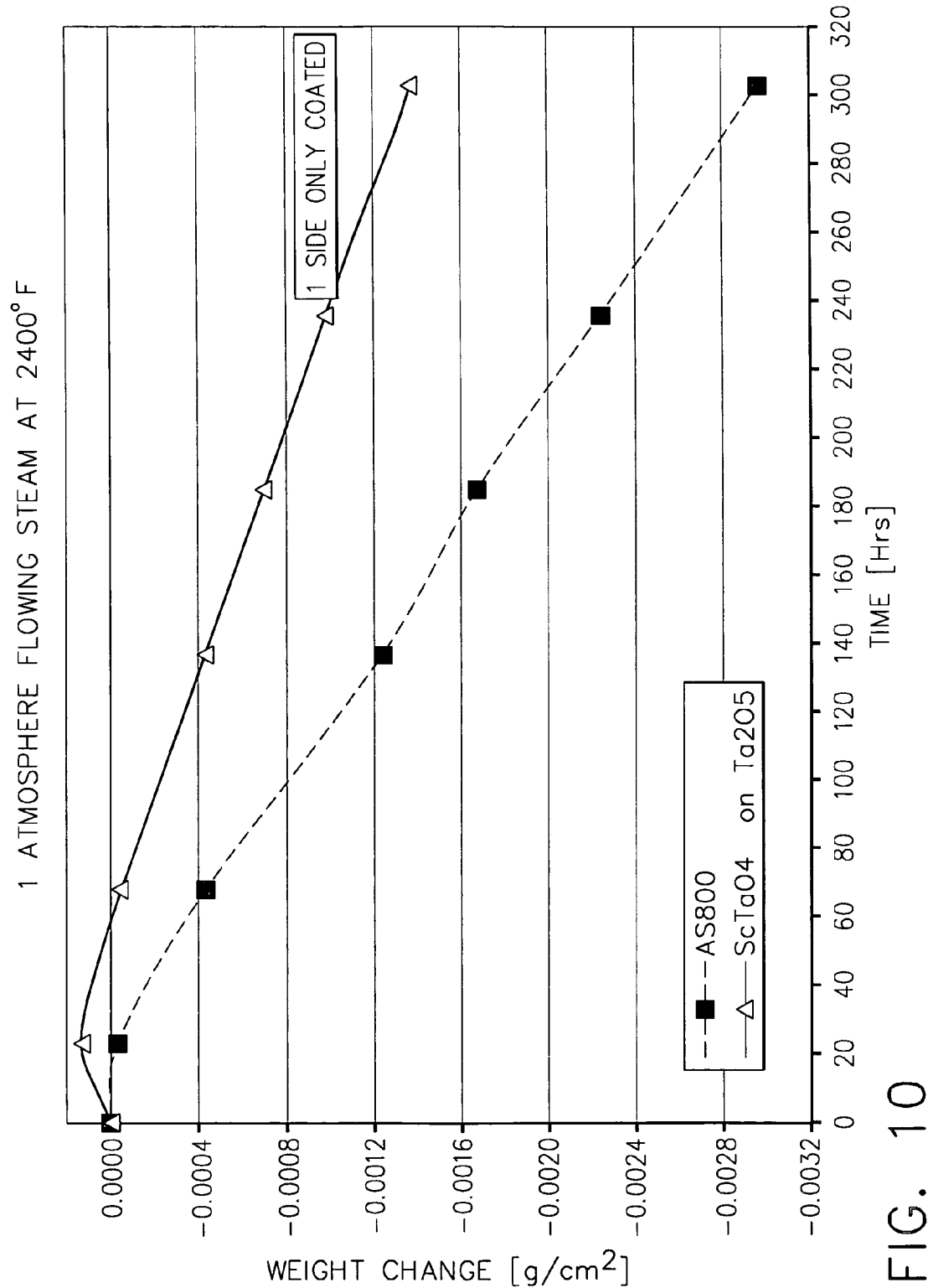
FIG. 10 is a graph showing weight loss of a dual layer coating of $ScTaO_4$ and $Ta_2O_5$ following steam furnace testing at 2400° F. for 300 hours, according to another aspect of the invention.

The coated samples were then tested in a steam furnace at 2400° F. under 1 atmosphere of flowing steam. The samples survived 300 hrs of testing; and although only one surface was coated, the weight change as a result of the steam furnace exposure was significantly reduced, FIG. 10. In fact, the reduction in weight change of over 50% suggests that the weight change was due entirely to the uncoated surfaces, and the scandium tantalate provided nearly complete protection to the coated surface.

It should be understood, of course, that the foregoing relates to exemplary embodiments of the invention and that modifications may be made without departing from the spirit and scope of the invention as set forth in the following claims.

We claim:

1. A component, comprising:
a silicon-based substrate; and
a protective coating in physical contact with said substrate, said protective coating comprising at least one layer of a tantalate-containing material substantially resistant to oxidation and water vapor, said tantalate-containing material comprising at least one tantalate selected from the group consisting of a rare earth tantalate, scandium tantalate, yttrium tantalate, and mixtures thereof.

2. The component according to claim 1, wherein said tantalate-containing material comprises at least about 50 mol % of said at least one tantalate.

3. The component according to claim 1, wherein said tantalate-containing material comprises at least about 90 mol % of said at least one tantalate.

4. The component according to claim 1, wherein said tantalate-containing material consists essentially of scandium tantalate.

5. The component according to claim 2, wherein said tantalate-containing material further comprises particles of an additive selected from the group consisting of silicon carbide, silicon nitride, silicon oxynitride, and mixtures thereof.

6. The component according to claim 1, wherein said tantalate-containing material further comprises an oxide of an element selected from the group consisting of Ta, Al, Hf, Ti, Zr, Mo, Nb, Ni, Sr, Mg, Si, Sc, Y, and the rare earth elements including the lanthanide series of elements.

7. The component according to claim 6, wherein said tantalate-containing material comprises at least about 50 mol % of said at least one tantalate, and said tantalate-containing material further comprises particles of an additive selected from the group consisting of silicon carbide, silicon nitride, silicon oxynitride, and mixtures thereof.

8. The component according to claim 1, wherein said substrate comprises silicon nitride or silicon carbide.

9. The component according to claim 1, wherein said protective coating serves as at least one of an oxygen barrier coating and an environmental barrier coating for said substrate.

10. The component according to claim 1, wherein said protective coating comprises a multilayer coating.

11. The component according to claim 10, wherein said multilayer coating further comprises at least one layer of silicate material.

12. The component according to claim 11, wherein said layer of silicate material comprises a silicate of at least one element selected from the group consisting of a rare earth element, scandium, and yttrium.

13. The component according to claim 11, wherein said layer of tantalate-containing material is disposed directly on said substrate, and said layer of silicate material is disposed on said layer of tantalate-containing material.

14. The component according to claim 11, wherein said layer of silicate material is disposed directly on said substrate, and said layer of tantalate-containing material is disposed on said layer of silicate material.

15. The component according to claim 11, wherein:
said multilayer coating further comprises a diffusion barrier coating disposed directly on said silicon-based substrate,
said diffusion barrier coating disposed below said at least one layer of tantalate-containing material and said at least one layer of silicate material,
wherein said diffusion barrier coating is comprised of at least one material selected from the group consisting of pure $Si_3N_4$, pure SiC, pure $Si_2ON_2$, Si, $TaSi_2$ and $MoSi_2$, and
wherein one of said at least one layer of tantalate-containing material and said at least one layer of silicate material is disposed directly on said diffusion barrier coating.

16. The component according to claim 11, wherein said at least one layer of silicate material is formed by the addition of up to 40 mol % of a particulate material selected from the group consisting of $Si_3N_4$, SiC, $Si_2ON_2$, and mixtures thereof, wherein said particulate material comprises particles having a diameter of less than 10 microns.

17. The component according to claim 16, wherein said particulate material comprises particles having a diameter of less than 2 microns.

18. The component according to claim 11, wherein said layer of silicate material comprises scandium monosilicate, scandium disilicate, or mixtures thereof.

19. The component according to claim 1, wherein said component is a part of a gas turbine engine.

20. The component according to claim 16, wherein said gas turbine engine is an auxiliary power unit of an aircraft.

21. The component according to claim 19, wherein said component is a nozzle, a wheel, an airfoil, a combustion chamber, a turbine shroud, or a hot gas duct of said gas turbine engine.

22. The component according to claim 1, further comprising a thermal barrier coating disposed on said protective coating.

23. A thermally protected component, comprising:
a silicon-based substrate; and
a protective coating of crystalline composition in physical contact with an outer surface of said substrate, wherein said protective coating comprises an alloy substantially resistant to oxidation and water vapor comprising:
at least 50 mol % of a rare earth tantalate, scandium tantalate, yttrium tantalate, or mixtures thereof; and
the balance comprising at least one oxide of an element selected from the group consisting of Ta, Al, Hf, Ti, Zr, Mo, Nb, Ni, Sr, Mg, Si, Sc, Y, and the rare earth elements including the lanthanide series of elements.

24. The thermally protected component according to claim 23, wherein said substrate is formed of a silicon-based ceramic material.

25. The thermally protected component according to claim 23, wherein said protective coating comprises at least 90 mol % of a rare earth tantalate, scandium tantalate, yttrium tantalate, or mixtures thereof.

26. The thermally protected component according to claim 23, wherein said protective coating comprises at least one of an oxygen barrier coating and an environmental barrier coating, and said component further comprises a thermal barrier coating disposed on said protective coating, wherein said thermal barrier coating comprises stabilized zirconia or stabilized hafnia.

27. The thermally protected component according to claim 23, wherein:
said protective coating comprises a multi-layered coating, said multi-layered coating comprising at least one of a diffusion barrier coating, an oxygen barrier coating, and an environmental barrier coating, and
said component further comprises a thermal barrier coating disposed on said protective coating, wherein said thermal barrier coating comprises stabilized zirconia or stabilized hafnia.

28. The thermally protected component according to claim 23, wherein:
said protective coating comprises at least one of an oxygen barrier coating and an environmental barrier coating,
said oxygen barrier coating comprising up to 40 mol % of a particulate material selected from the group consisting of $Si_3N_4$, SiC, $Si_2ON_2$, and mixtures thereof, wherein said particulate material comprises particles having a diameter of less than 10 microns, and
said component further comprises a thermal barrier coating disposed on said protective coating.

29. A component for a gas turbine engine, comprising:
a silicon-based substrate comprising silicon nitride or silicon carbide; and
a multi-layered protective coating of crystalline composition in physical contact with an outer surface of said substrate, wherein said protective coating comprises:
at least one layer of a tantalate-containing material that is substantially resistant to oxidation and water vapor, and
at least one layer of a silicate material, wherein said tantalate-containing material comprises:
at least 50 mol % of a rare earth tantalate, scandium tantalate, yttrium tantalate, or mixtures thereof; and
the balance comprising at least one oxide of an element selected from the group consisting of Ta, Al, Hf, Ti, Zr, Mo, Nb, Ni, Sr, Mg, Si, Sc, Y, and the rare earth elements including the lanthanide series of elements, and wherein said silicate material comprises:
a silicate of at least one element selected from the group consisting of a rare earth element, scandium, and yttrium.

* * * * *

UNITED STATES PATENT AND TRADEMARK OFFICE
CERTIFICATE OF CORRECTION

PATENT NO.        : 7,638,178 B2                                    Page 1 of 1
APPLICATION NO. : 10/982445
DATED             : December 29, 2009
INVENTOR(S)       : Raybould et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1353 days.

Signed and Sealed this

Ninth Day of November, 2010

David J. Kappos
*Director of the United States Patent and Trademark Office*